United States Patent [19]

Senso

[11] Patent Number: 4,629,949
[45] Date of Patent: Dec. 16, 1986

[54] APPARATUS FOR DRIVING A TURNTABLE OF A DISC PLAYER SYSTEM

[75] Inventor: Hitoshi Senso, Tokorozawa, Japan

[73] Assignee: Pioneer Electronic Corporation, Tokyo, Japan

[21] Appl. No.: 666,307

[22] Filed: Oct. 30, 1984

[30] Foreign Application Priority Data

Nov. 1, 1983 [JP] Japan .......................... 58-169554[U]

[51] Int. Cl.$^4$ ............................................. H02P 3/10
[52] U.S. Cl. .................................. 318/257; 318/254; 318/264; 318/293; 318/374
[58] Field of Search ................... 318/138, 254 A, 254, 318/256, 257, 264, 265, 293, 439, 371, 373, 374, 375

[56] References Cited

U.S. PATENT DOCUMENTS

| 4,079,942 | 3/1978 | Kunen | 318/313 X |
| 4,460,857 | 7/1984 | Michaelis | 318/375 |
| 4,549,120 | 10/1985 | Banno et al. | 318/254 |

FOREIGN PATENT DOCUMENTS

| 52-34310 | 3/1977 | Japan | 318/373 |
| 55-74385 | 6/1980 | Japan | 318/254 |
| 56-59305 | 5/1981 | Japan | 318/254 |
| 57-52397 | 3/1982 | Japan | 318/254 |
| 57-78357 | 5/1982 | Japan | 318/138 |
| 57-148585 | 9/1982 | Japan | 318/373 |
| 58-163281 | 9/1983 | Japan | 318/373 |
| 2077530 | 12/1981 | United Kingdom | 318/254 |

OTHER PUBLICATIONS

IBM Technical Disclosure Bulletin, vol. 11, No. 12, May 1969, p. 1697.

Primary Examiner—William M. Shoop, Jr.
Assistant Examiner—Bentsu Ro
Attorney, Agent, or Firm—Fleit, Jacobson, Cohn & Price

[57] ABSTRACT

An apparatus for driving a turntable of a disc player system including a first drive voltage source for supplying a first driving voltage driving a spindle motor in a normal direction, a second drive voltage source for generating a second drive voltage for driving the spindle motor in a reverse direction, a voltage supply control circuit means for selectively supplying one of first and second drive voltages in accordance with a play command signal and a stop command signal, and a detection means for detecting the rotation of a rotor of the spindle motor in the reverse direction. When the stop command signal is supplied, the second drive voltage is supplied to the spindle motor for applying a driving torque of reverse direction to the rotor of the spindle motor and the supply of the second drive voltage is stopped immediately when the reverse direction rotation of the rotor is detected by the detection means. Thus, a very quick and accurate control of the stoppage of the spindle motor is realized.

3 Claims, 8 Drawing Figures

APPARATUS FOR DRIVING A TURNTABLE OF A DISC PLAYER SYSTEM

BACKGROUND OF THE INVENTION

1. Field of the Invention

The present invention relates to an apparatus for driving a turntable of a disc player system, and more specifically to an apparatus for driving a turntable, having power sources for a normal and a reverse direction rotation of a spindle motor and a control circuit for controlling the supply of the power voltage from one of the power sources.

2. Description of Prior Art

In disc player systems such as a video disc player system and a compact disc player system, it is necessary to appropriately control the speed of rotation of a turntable depending on various modes of operations of the disc player system, including a stop mode in which the speed of rotation of the turntable should be decelerated relatively rapidly. In order to realize a sufficient deceleration, a driving voltage of an inverse polarity is generally applied to the spindle motor after the generation of a stop command signal so that the driving force of the reverse direction is applied to a rotor of the spindle motor. When the speed of the spindle motor has sufficiently dropped by this driving force of reverse direction, the supply of the driving voltage is stopped and the spindle motor is made coasting, or in other words, put into a free-running state.

For detecting the speed of the spindle motor, conventional apparatuses for driving a turntable are equipped with a frequency generator connected to the shaft of the spindle motor and peripheral circuits for determining the speed of the spindle motor from an output signal of the frequency generator. However, a drawback of the conventional apparatuses was that the reference speed of the spindle motor at which the driving of the motor is stopped and the spindle motor starts to coast was set relatively high due to the necessity of maintaining the stability of the circuits. Therefore, a long time was needed before the spindle motor stops completely. Further it was not easy to obtain a signal indicative of the complete stoppage of the spindle motor.

SUMMARY OF THE INVENTION

The present invention is contemplated to improve the above problems of the conventional arrangements and to provide an apparatus for driving a turntable of a disc player system by which the turntable is immediately stopped after the end of the play and an accurate information of the stoppage of the turntable can be obtained.

According to the present invention, the rotation of the rotor of the spindle motor in the reverse direction is detected very quickly and the spindle motor is put into a free running state immediately after the reception of the detection signal.

According to an aspect of the invention, a detection means for detecting the direction of rotation of the rotor of the spindle motor is provided and which detection means comprises at least three HALL devices positioned around outer periphery of the rotor to detect the change of the magnetic field generated by the rotor. Output signals of the HALL devices are connected to corresponding edge pulse train signal generators each of which generates an edge pulse train signal each pulse of which is generated at a timing of a leading edge or a trailing edge of the output signal of the HALL device.

The thus produced edge pulse train signals are then applied to a logic circuit means where the direction of rotation of the rotor is detected by means of the phase relation among the edge pulse train signals and a reverse direction rotation detection signal is generated in accordance with the result of the detection of the direction of rotation.

Further scope of applicability of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF A PREFERRED EMBODIMENT

Figure 1:
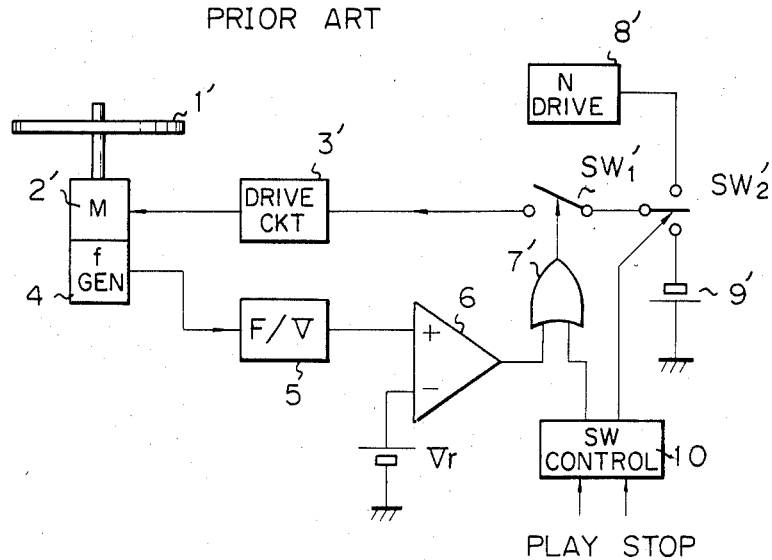
FIG. 1 is a block diagram of a conventional apparatus for driving a turntable for a conventional disc playing system.

Before entering into the explanation of the embodiments of the present invention, reference is first made to FIG. 1, in which an example of the conventional apparatus for driving a turntable of a disc player system is illustrated.

In FIG. 1, a wheel for supporting a record disc to be played, that is, a turntable is indicated at 1'. The turntable 1' is mounted on a shaft of a spindle motor 2' which is controlled by a control circuit having a construction described hereinafter. The spindle motor 2' is driven in the normal direction or in the reverse direction in accordance with a normal direction drive signal or a reverse direction drive signal from a drive circuit 3'. Further, a frequency generator 4 is connected to the shaft of the motor 2 so as to generate a frequency signal whose frequency is proportional to the speed of rotation of the spindle motor 2'. The frequency signal from the frequency generator 4 is supplied to a frequency to voltage (F/V) converter 5 in which a voltage signal having a voltage proportional to the frequency of the signal from the frequency generator 4 is generated. The voltge signal from the F/V converter 5 is in turn applied to a comparator 6 in which the voltage signal is compared with a predetermined reference voltage Vr. When the level of said voltage signal becomes lower than the level of the reference signal Vr, the comparator 6 produces an off command signal and applies the same to an OR gate 7'. Upon application of the off command signal, the OR gate 7' produces a switch off control signal and applies the same to a switch $SW_1'$ inserted in a power line of the drive circuit 3'. When the switch $SW_1'$ is opened by the switch off control signal from the OR gate 7', the supply of the drive current to the spindle motor 2' is stopped so that the spindle motor 2' is put into a free running state. In order to supply a drive current to the spindle motor 2', there is provided a normal direction drive voltage generating circuit 8' for generating a normal direction drive voltage for driving the spindle motor 2' in a normal direction. This drive voltage of the normal direction may be contolled by means of a spindle servo circuit (not shown) for maintaining the speed of the spindle motor at a predetermined desired level. Also, there is provided a reverse direction drive voltage source 9' which generates a drive voltage of the spindle motor for driving the spindle motor in a reverse direction. The selection between the normal direction drive voltage generating circuit 8' and the reverse direction drive voltage source 9' is performed by means of a switch $SW_2'$ which is controlled by means of a switch control circuit 10. The switch control circuit 10 receives a play command signal (PLAY) and a stop command signal (STOP) from suitable means such as manually operable command switches. During a time period from the generation of the play command signal to the generation of the stop command signal, the normal direction drive voltage from the generating circuit 8' is supplied to the drive circuit 3' through the switch $SW_2'$ in accordance with the operation of the switch control circuit. Conversely, after the generation of the stop command signal, the reverse direction drive voltage from the voltage source 9' is supplied to the drive circuit 3' through the switch $SW_2'$ so as to decelerate the speed of the spindle motor. Further, the switch control circuit 10 produces an "on" signal for closing the first switch $SW_1'$ during the time period of application of the normal direction drive voltage, that is, the time from the generation of the play command signal to the time of generation of the stop command signal.

In summary, the above drive circuit provides the reverse direction drive current after the generation of the stop command signal to rapidly slow down the speed of the spindle motor. Further, the first switch $SW_1'$ is shut-off when the speed of the spindle motor 2' has slowed down lower than a predetermined level so that the spindle motor will sponteneously stop after coasting.

However, as mentioned before, the reference potential Vr can not be set at a too low level because of the necessity of maintaining the stability of the circuit. Therefore, in conventional apparatuses, the driving of the spindle motor is stopped and put into the free running state at a relatively high speed. As a result, in the conventional arrangements, the time required before the spindle motor stops completely was excessively long. Also, it was not easy to obtain a signal indicative of the complete stoppage of the sprindle motor.

Figure 2:
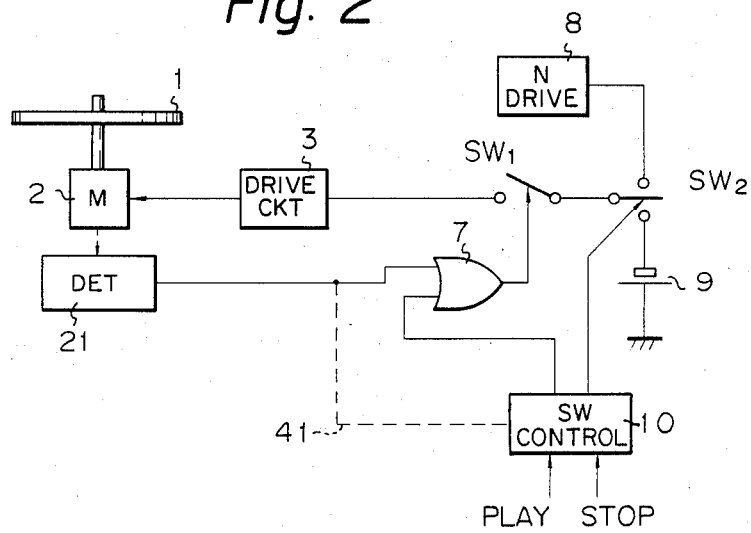
FIG. 2 is a block diagrm showing the apparatus for driving a turntable for a disc playing system.

Turning to FIG. 2, the first embodiment of the disc drive apparatus according to the present invention will be explained.

As shown, the apparatus of this embodiment includes a detector 21 for detecting the reverse rotation of the spindle motor 2 instead of the frequency generator 4, the F/V converter 5, and the comparator 7' of the conventional apparatus. The remaining part of the apparatus is the same as the corresponding part of the conventional arrangement and which are as follows. A turntable 1 is mounted on a shaft of a spindle motor 2 which is supplied with a drive voltage from a drive circuit 3. A switch $SW_1$ which is on/off controlled by an output signal of an OR gate 7 is connected to the drive circuit 3 so as to control the transmission of the driving voltage of the normal direction or the reverse direction. A normal direction drive voltage generating circuit 8 and a reverse direction drive voltage source 9 are provided for respectively generating a drive voltage for driving the spindle motor 2 in the normal direction and a drive voltage for driving the spindle motor 2 in the reverse direction. The voltages from the normal direction drive voltage generating circuit 8 and the reverse direction drive voltage source are respectively connected to two stationary terminals of a second switch $SW_2$ which is controlled by a switch control circuit 10 and whose movable contact is connected to a terminal of the switch $SW_1$.

In the thus constructed embodiment of the apparatus according to the present invention, the operation is as follows. When a play command signal is applied to the switch control circuit 10, the switch $SW_1$ is closed and the switch $SW_2$ is operated at the same time so that the movable contact thereof connects to the stationary contact to which the voltage from the normal direction drive voltage generating circuit 8 is supplied. Thus, the drive circuit 3 is supplied with the normal direction drive voltage through the switches $SW_1$ and $SW_2$. Conversely, when a stop command signal or an end of play detection signal is applied to the switch control circuit 10, i.e., when the turntable 2 is to be stopped, the movable contact of the second switch $SW_2$ is moved to the stationary contact to which the reverse direction drive voltage is applied, in accordance with the operation of the switch control circuit 10. In this state, the rotor of the spindle motor 2 is subjected to the driving torque of the reverse direction, and accordingly, the speed of the spindle motor 2 gradually decreases. Further, if the spindle motor 2 begins to rotate in the reverse direction, the detection circuit 21 immediately detects this state and produces a reverse rotation detection signal. The reverse rotation detection signal is in turn supplied to the OR gate 7 to open the first switch $SW_1$. As a result, the spindle motor is put into a free running state. It is to be noted that the duration of this free running state is considerably short because the supply of the drive current to the spindle motor is stopped immediately after the beginning of the reverse rotation. In addition, the higher the accuracy of the reverse detection circuit 21 becomes, the shorter time is required for the complete stoppage of the spindle motor 2.

Figure 3:
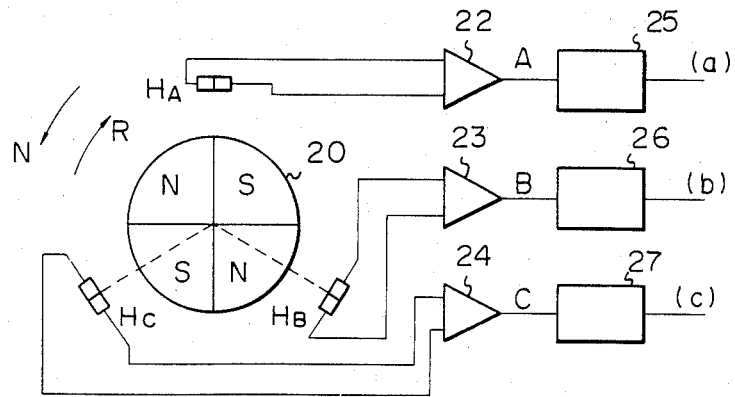
FIGS. 3 and 5, when combined together, show an example of the motor drive direction detection circuit which is to be used in the circuit construction of FIG. 2.

The detail of the reverse rotation detection circuit 21 will be explained with reference to FIG. 3 through FIG. 6B of the accompanying drawings. FIGS. 3 and 5, when combined, illustrate an example of the rotation direction detection circuit, that is, the reverse rotation detection circuit for a spindle motor 2 of the type of three-phase four pole brushless motor.

In FIG. 3, a rotor 20 of the spindle motor 2 is illustrated and the manner of the magnetization thereof is such that each quadrant of the rotor 20 is provided with a magnetic pole, and opposite magnetic poles are arranged alternately to each other around an axis of the rotor 20. In addition, the arrow N and the arrow R in FIG. 3 indicate the normal and the reverse direction of rotation respectively. Around the outer periphery of the rotor 20, there are provided three HALL devices $H_A$, $H_B$ and $H_C$ which are located 120 degrees apart. In other words, the HALL devices $H_A$, $H_B$, and $H_C$ are angularly spaced apart from each other at 60 degrees of electrical angle. Output terminals of the HALL devices $H_A$, $H_B$, and $H_C$ are respectively applied to amplifiers 22, 23, and 24 which will be referred to as HALL amplifiers. Output signals of the HALL amplifiers 22, 23, and 24 are in turn applied to edge detectors 25, 26, and 27 respectively. Each of the edge detectors 25, 26, and 27 generates an output pulse signal (a), (b), or (c) upon reception of a leading edge or a trailing edge of the input pulse signal from the HALL amplifier 22, 23, or 24.

Figure 4A:
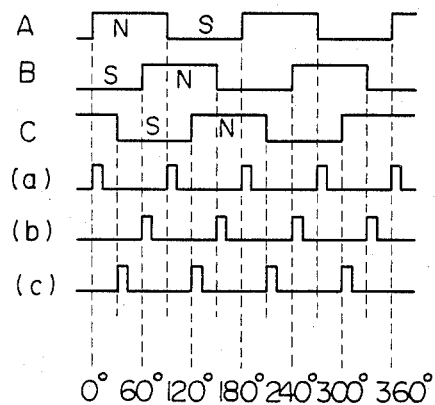
FIGS. 4A and 4B respectively show waveforms of the output signals of the HALL amplifers and the output signals of the edge detectors used in the apparatus according to the present invention.
Figure 4B:
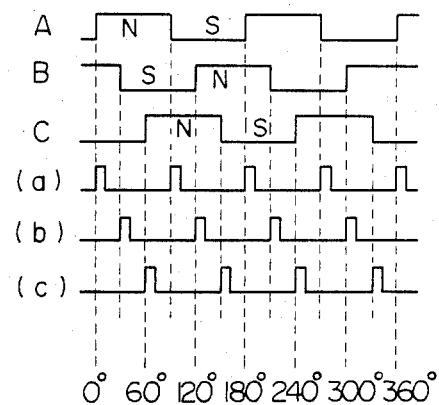
Figure 5:
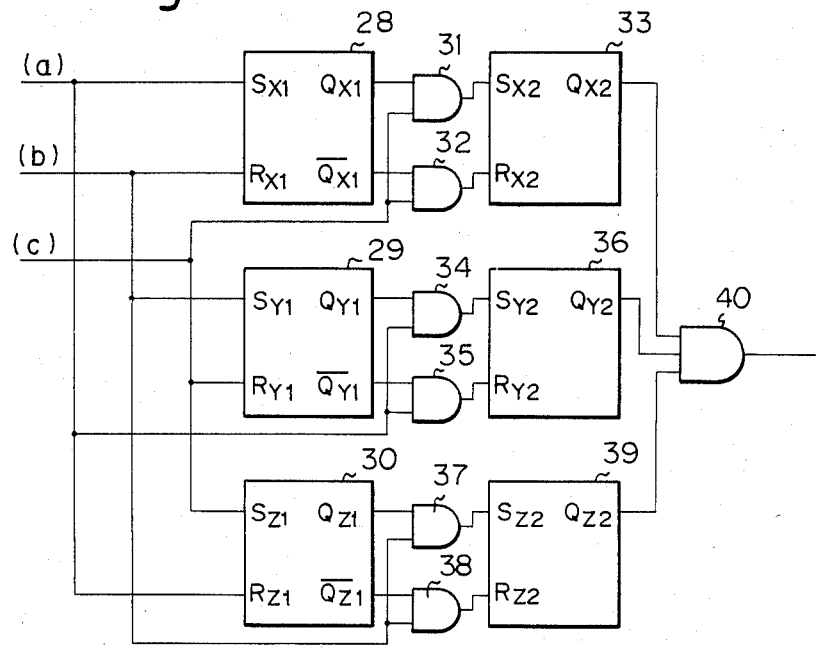

FIGS. 4A and 4B show waveforms of the output signals A, B, and C of the HALL amplifiers 22 through 24, and the output pulse signals (a), (b), and (c) of the edge detectors 25 through 27.

Reference is next made to FIG. 5 in which the remaining portion of the reverse rotation detection circuit 21 is illustrated.

In FIG. 5, there are provided three flip-flop circuits 28 through 30 and the output signals (a) and (b) of the edge detectors 25 and 26 are respectively applied to a set terminal $S_{X1}$ and to a reset terminal $R_{X1}$ of the flip-flop 28. Similarly, the output pulse signal (b) and (c) of the edge detectors 26 and 27 are respecitvely applied to a set terminal $S_{Y1}$ and a reset terminal $R_{Y1}$ of the flip-flop 29, and output pulse signals (c) and (a) of the edge detectors 27 and 25 are applied to a set terminal $S_{Z1}$ and a reset terminal $R_{Z1}$ of the flip-flop 30. Output signals developed at output terminals $Q_{X1}$ and $\overline{Q_{X1}}$ of the flip-flop 28 are respectively applied to a pair of AND gates 31 and 32 which are supplied with the signal (c) from the edge detector 27. In AND gates 31 and 32, an AND signal between the signal from the terminal $Q_{X1}$ or $\overline{Q_{X1}}$ from the flip-flop 28 and the signal (c) input from the other input terminal thereof is generated respectively. The thus calculated AND signals are applied to a set terminal $S_{X2}$ and a reset terminal $R_{X2}$ of a flip-flop 33. On the other hand, signals developed at output terminals $Q_{Y1}$, $\overline{Q_{Y1}}$ of the flip-flop 29 are applied to AND gates 34 and 35 to which the signal (a) from the edge detector 25 is applied. In AND gates 34 and 35, an AND signal between the signal from the terminal $Q_{Y1}$ or $\overline{Q_{Y1}}$ of the flip-flop 29 and the signal (a) input from the other input terminal thereof is generated respectively. The thus calculated AND signals of the AND gates 34 and 35 are then applied to a set terminal $S_{Y2}$ of a flip-flop 36. Further, signals developed at output terminals $Q_{Z1}$, $\overline{Q_{Z1}}$ of the flip-flop 30 are applied to a pair of AND gates 37 and 38 which are supplied with the signal (b) from the edge detector 26. In AND gates 37 and 38, an AND signal between the signal from the terminal $Q_{Z1}$ or $\overline{Q_{Z1}}$ of the flip-flop 30 and the signal (b) input from other input terminal thereof is generated respectively. The thus calculated AND signals of the AND gates 37 and 38 are then applied to a set terminal $S_{Z2}$ and a reset terminal $R_{Z2}$ of a flip-flop 39. Output signals developed at output terminals $Q_{X2}$, $Q_{Y2}$, and $Q_{Z2}$ of the flip-flops 33, 36, and 39 respectively are applied to an AND gate 40 as input signals.

Figure 6A:
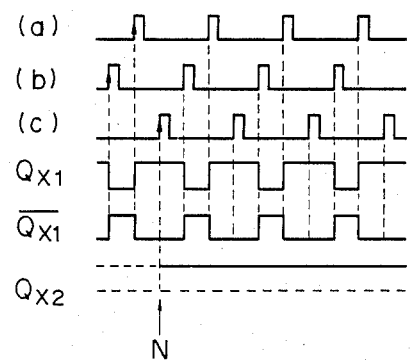
FIGS. 6A and 6B are waveform diagrams showing the signals which appear in the circuit of FIG. 5 when the rotor of the spindle motor is rotating in the normal direction and when the rotor of the spindle motor is rotating in the reverse direction respectively.
Figure 6B:
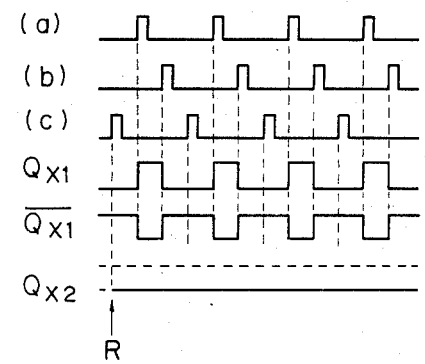

The operation of the thus constructed reverse rotation detection circuit 21 is as follows:

FIG. 6A shows the waveforms of the signals (a) through (c) of the edge detectors 25 through 27 and the output signals at the terminals $Q_{X1}$, $\overline{Q_{X1}}$, $Q_{X2}$ of the flip-flops 28 and 33 which are observed when the rotor 20 of the spindle motor 2 is rotating in the normal direction. Similarly, FIG. 6B shows the waveforms of the same signals observed when the rotor 20 of the spindle motor 2 is rotating in the reverse direction. Operation of the circuit when the spindle motor is rotating in the normal direction will be explained with reference to FIG. 6A. When the signal (b) has a high (referred to as simply H hereafter) level, the signal at the terminal $Q_{X1}$ has a low (referred to as simply L hereafter) level, and the signal at the terminal $\overline{Q_{X1}}$ has the H level. On the other hand, when the level of the signal a becomes H at a next moment, the signal at the terminal $Q_{X1}$ becomes H and the signal at the terminal $\overline{Q_{X1}}$ becomes L. Further, when the level of the signal (c) becomes H at a further next moment, the flip-flop 33 is applied with the H level signal from the terminal $Q_{X1}$ and the L level signal from the terminal $\overline{Q_{X1}}$ respectively at the set terminal $S_{X2}$ and the reset terminal $R_{X2}$ in accordance with the operation of the AND gates 31 and 32. Therefore, the flip-flop 33 is supplied with only the set signal from the AND gate 31 and the flip-flop 33 produces a H level output signal at the output terminal $Q_{X2}$ thereof at a point of time indicated by N in FIG. 6A. In this way, a signal indicating the normal direction of rotation of the spindle motor is generated by the flip-flop 33.

Conversely, operation of the circuit when the spindle motor rotates in the reverse direction will be explained with reference to FIG. 6B. When the rotor 20 of the spindle motor 2 is rotating in the reverse direction, the signals (a) and (b) appear in an inverse order before the appearance of the signal (c), as compared with the case of the rotation of the rotor 20 in the normal direction. Therefore, only the AND gate 32 provides the H level signal to the flip-flop 33 when the signal (c) has the H level. As a result, the flip-flop 33 is supplied with only the reset signal from the AND gate 32 the level of the signal at the output terminal $Q_{X2}$ turns to the L level at a point of time indicated by R in FIG. 6B.

The operation of the flip-flops 28 and 33, and the AND gates 31 and 32 are described above. However, it will be readily understood that the operations of the other parts of the reverse rotation detection circuit 21, i.e., the flip-flops 29, 36, 30 and 39, and AND gates 34, 35, 37, and 38 are the same as above, and H level signals are produced at the output terminal $Q_{Y2}$ and the output terminal $Q_{Z2}$ of the flip-flops 36 and 39 respectively when the rotor of the spindle motor 2 is rotated in the normal direction. Similarly, L level signals are produced at the output terminal $Q_{Y2}$ and the output terminal $Q_{Z2}$ of the flip-flops 36 and 39 respectively when the rotor 20 of the spindle motor 2 is rotating in the reverse direction. Thus, the AND gate 40 produces an H level, i.e., logical "1", signal during the normal direction rotation of the spindle motor 2 and a L level, i.e., logical "0", signal during the reverse direction rotation of the spindle motor 2.

Further, it is to be noted that the direction of the rotation of the rotor of the spindle motor is detected each time when one of the signals (a) through (c) turns to the high level. In other words, the above detection is performed every 30 degrees rotation of the rotor 20 of the spindle motor 2. Therefore, even after a substantial drop of the speed of the spindle motor at the time of the stoppage of the spindle motor 2, the reverse rotation can be detected so long as the rotor 20 is rotated in the reverse direction more than 30 degrees.

Thus, with this reverse rotation detection circuit 21, the rotor 20 of the spindle motor is put into the free running state after the reverse direction rotation of 30 degrees of the rotor 20 and the rotor 20 will, afterwards, stop completely.

It is to be noted and that even an embodiment of the present invention has been described by way of example of a three-phase four pole brushless motor, various types of detection of the rotation direction can be utilized. As an example, instead of HALL devices, photo detectors can be used for generating the signal indicative of the position of the rotor of the spindle motor. Further, by increasing the number of HALL devices or the number of the magnetic poles, the accuracy of the detection can be improved. In other words, the minimum angle of the rotation of the rotor by which the rotation of reverse direction is detected can be reduced, and the speed at which the free running of the rotor starts, can be lowered to a very slow speed which is close to the standstill state.

As explained in detail in the above, in the case of the preferred embodiment, the apparatus is constructed to put the motor into the free running state after the generation of the signal indicative of the reverse direction rotation of the motor. However, as indicated by the dashed line 41 of FIG. 2, the apparatus can be modified so that the output signal of the reverse rotation detection circuit 21 is applied to the control circuit. By this modification, the normal direction drive voltage can be applied to the drive circuit 3 for a very short time period when the reverse direction rotation of the spindle motor is detected. By this provision, a small amount of the normal direction drive torque is applied to the rotor to cancel the energy of the rotation of the reverse direction. Thus, the stoppage of the spindle motor can be controlled very accurately in this modification.

It will be appreciated from the foregoing, according to the present invention, the apparatus for driving a turntable of a disc player system is provided with a reverse direction rotation detection device which can detect the direction of the rotation of the rotor of the spindle motor very accurately. Therefore, when the stop command is generated, the spindle motor is stopped before the rotor is rotated in the reverse direction more than one revolution thereof. Further, by the present invention, it becomes no more necessary to provide the expensive frequency generator and peripheral circuits to the spindle motor, and the cost of the stoppage control circuit is by far reduced.

Moreover, since the signal indicative of almost complete stoppage of the spindle motor is generated in the case of the apparatus of the present invention, this signal can be used as a signal indicative of the permission or inhibition of the unloading of the disc from the disc player system.

What is claimed is:

1. An apparatus for driving a turntable of a disc player system comprising:
   a spindle motor for driving said turntable, having a rotor;
   a first drive voltage source of a first drive voltage which drives said spindle motor in a normal direction;
   a second drive voltage source of a second drive voltage which drives said spindle motor in a reverse direction;
   a detection means for detecting the direction of rotation of said rotor of spindle motor including detection elements disposed around an axis of rotation of said rotor and generating a reverse direction rotation detection signal when at least a reverse direction rotation of said rotor for a predetermined rotation angle, which is smaller than an angular distance between adjacent two of said detection elements, is detected; and
   a voltage supply control means responsive to said reverse direction rotation detection signal from said detection means, a play command signal and a stop command signal and connected between said spindle motor and said first and second sources, for selectively supplying said first drive voltage to said spindle motor in response to said play command signal, selectively supplying said second drive voltage to said spindle motor upon reception of said stop command signal, and stopping the supply of said second drive voltage to put the spindle motor into a free running state when said reverse direction rotation detection signal is supplied from said detection means.

2. An apparatus as set forth in claim 1, wherein said voltage supply control means includes a change-over switch having a movable switch contact and a pair of stationary switch contacts respectively connected to said first and second drive voltage sources, said movable contact being operated to connect to said stationary contact connected to said second drive voltage source when said stop command signal is applied to said voltage supply control means, and an on/off switch connected between said spindle motor and said movable switch contact of said change-over switch, said on/off switch being closed during a time priod from a time of generation of said play command signal to time of application of said reverse direction rotation detection signal from said detection means.

3. An apparatus as set forth in claim 1, wherein said rotor of spindle motor has a predetermined number of magnetic poles around an axis of rotation thereof, and said detection means comprises:
   at least three HALL devices as said detection elements positioned around outer periphery of said rotor so as to be angularly spaced apart from each other at a predetermined electrical angle;
   at least three edge pulse train signal generators respectively connected to an output signal of said HALL device, for respectively generating an edge pulse train signal each pulse thereof is generated at the timing of a leading edge or a trailing edge of said output signal of HALL device; and
   a logic circuit means connected to said edge pulse train signal generators, for generating the reverse direction rotation detection signal when a reverse direction rotation of the rotor of spindle motor is detected by means of an order of occurence of pulses belonging to different edge pulse train signals after a generation of a pulse belonging to an edge pulse train signal other than said different edge pulse train signals.

* * * * *